Dec. 30, 1969  E. C. ELSNER  3,486,772
FLUID COUPLING WITH DEFORMABLE HOLDING MEANS
Filed Dec. 5, 1966  3 Sheets-Sheet 1

INVENTOR
EDWIN C. ELSNER

BY
ATTORNEY

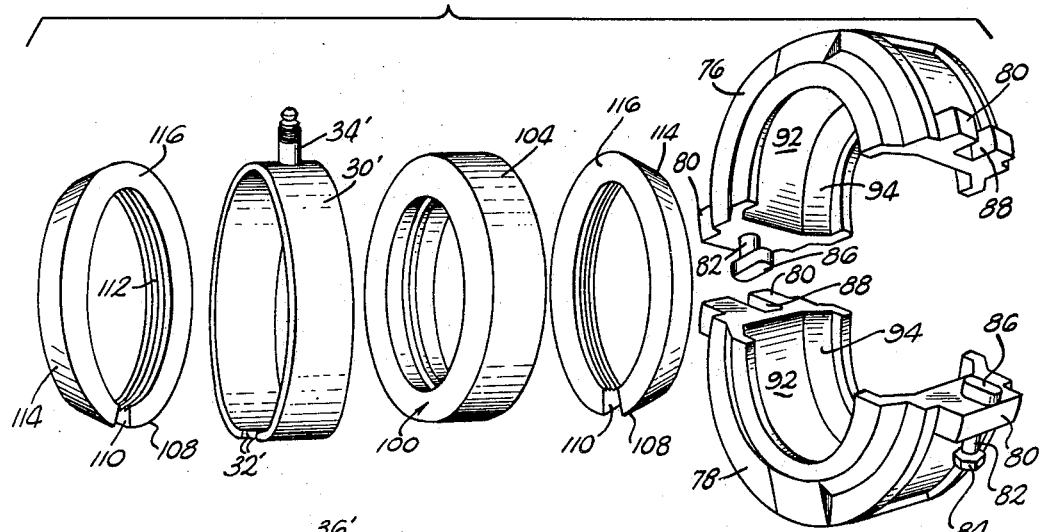
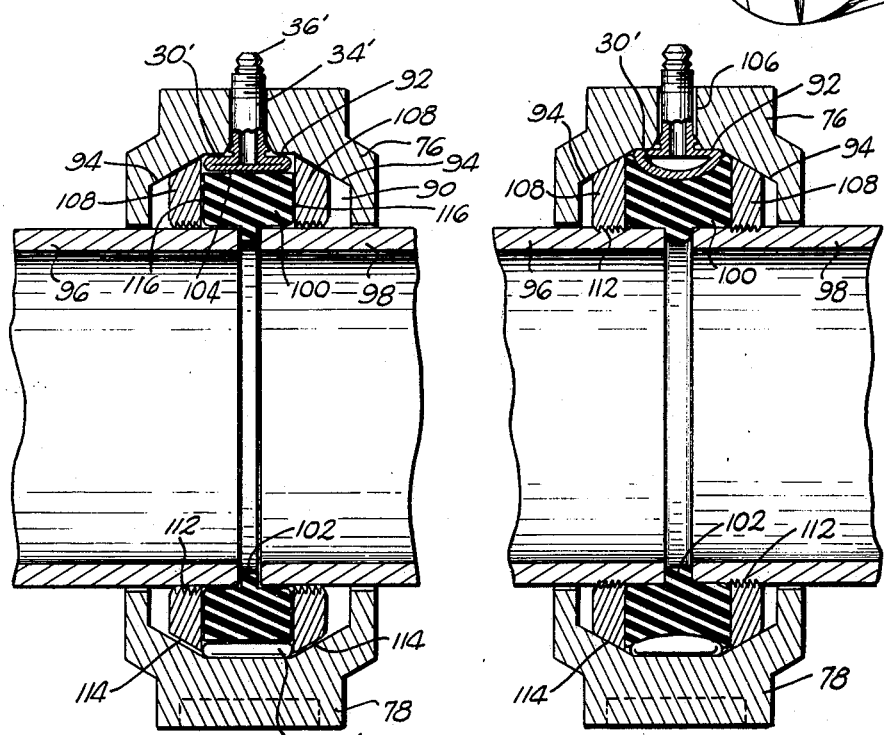

Dec. 30, 1969   E. C. ELSNER   3,486,772
FLUID COUPLING WITH DEFORMABLE HOLDING MEANS
Filed Dec. 5, 1966   3 Sheets-Sheet 3

INVENTOR
EDWIN C. ELSNER

BY

ATTORNEY

United States Patent Office 3,486,772
Patented Dec. 30, 1969

3,486,772
FLUID COUPLING WITH DEFORMABLE HOLDING MEANS
Edwin C. Elsner, Los Angeles, Calif., assignor to Aeroquip Corporation, Jackson, Mich.
Filed Dec. 5, 1966, Ser. No. 599,134
Int. Cl. F16j 15/46; F16l 21/02, 17/00
U.S. Cl. 285—96                                6 Claims

ABSTRACT OF THE DISCLOSURE

The invention relates to a coupling or seal for conduits wherein sealing is accomplished by a deformable gasket which is deformed and compressed into engagement with the conduit by fluid pressure within an inflatable bladder cooperating with the gasket. In order to direct the forces produced in the bladder by inflation into an effective operative relationship with the gasket, a retainer is employed in conjunction with the bladder to locate and retain the coupling components in the proper relationship.

BACKGROUND OF THE INVENTION

Conventional couplings used to connect conduits, particularly in larger sizes have used threads, flanges, bell housings and other conventional coupling structures and are normally expensive, bulky and difficult to assemble. In these types of conventional couplings, compression of the sealing gasket is usually produced by bolts, constricting bands or similar apparatus and uniform deformation and compression of the gasket has been difficult to obtain, particularly in the larger sizes.

SUMMARY OF THE INVENTION

The present invention provides a coupling or seal for conduits wherein sealing is accomplished by a deformable gasket, preferably of a rubber or rubber-like material which is deformed and compressed into engagement with the conduit by fluid pressure within an inflatable bladder cooperating with the gasket. In order to direct the forces produced in the bladder by inflation into an effective operative relationship with the gasket, a retainer is employed in conjunction with the bladder to locate and retain the coupling components in the proper relationship during inflation and use. The gasket is annular and solid in the principal embodiments of the invention while the bladder is made of metal and in its deflated condition, is flat. The invention may be used to sealingly connect two telescoping conduits, to interconnect and seal two abutting conduits or to provide a repair to a damaged conduit by forcing a flat, partially cylindrical gasket against the damaged area. The overall contour of the invention is relatively small, is readily assemblable and is actuated into position by merely attaching a source of fluid pressure.

Figure 1:
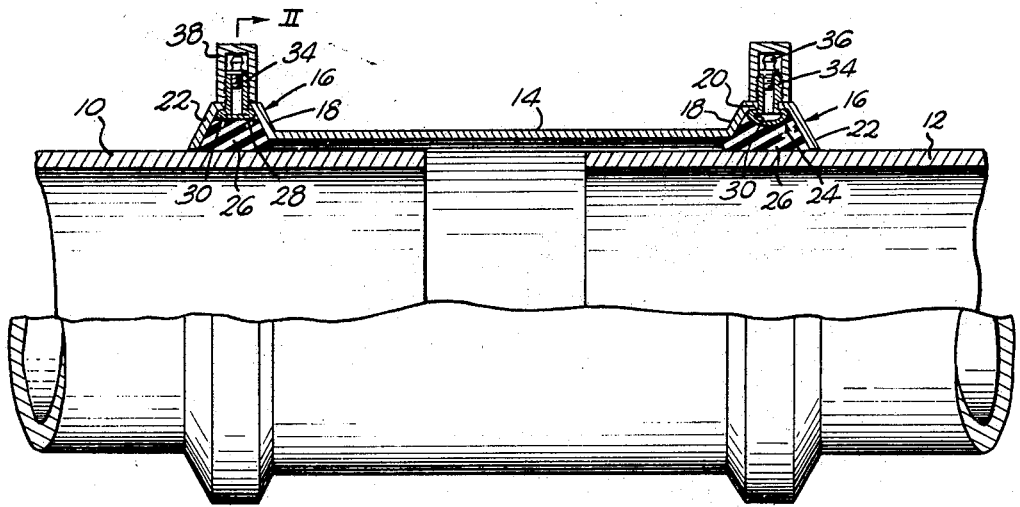
Figure 3:
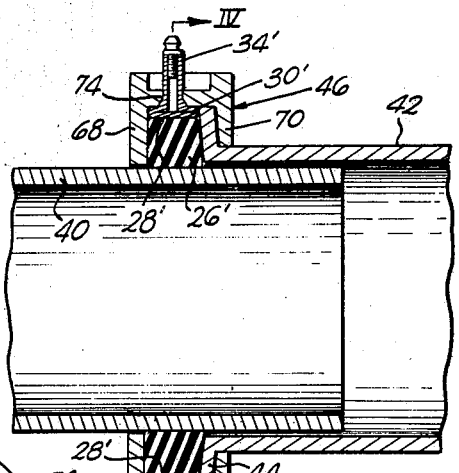
Figure 4:
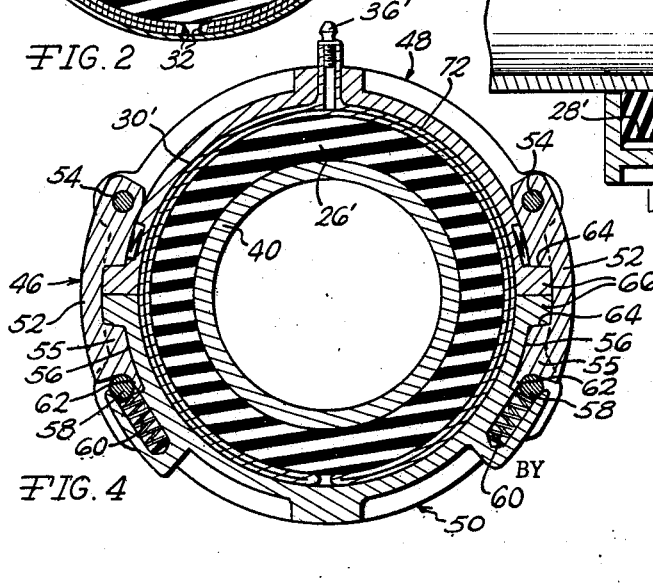
Figure 8:
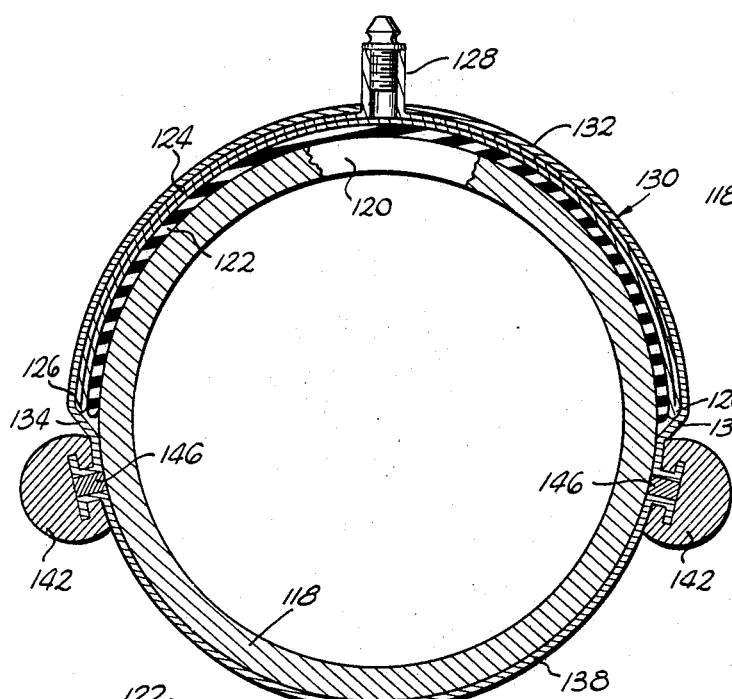
Figure 10:
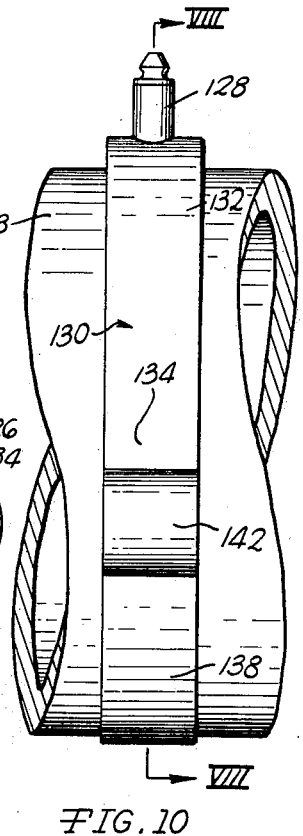
Figure 9:
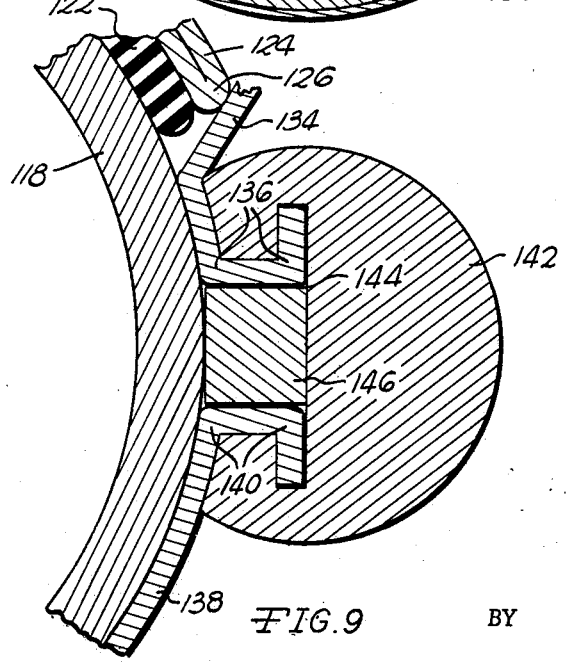

In the drawings:
FIG. 1 is an elevational, partly sectioned, view of an embodiment of the invention, wherein a telescoped sleeve interconnection between conduits is produced, only the right gasket and bladder being shown in the operative sealed condition,
FIG. 2 is an elevational, sectional view of the assembly of FIG. 1, as taken along section II—II thereof,
FIG. 3 is a detail, elevational, diametrical sectional view of another embodiment of coupling, using the inventive concept of the invention,
FIG. 4 is an elevational, sectional view taken along section IV—IV of FIG. 3,
FIG. 5 is a perspective, exploded view of another embodiment of coupling constructed in accord with the invention for maintaining couplings in an end-to-end relationship,
FIG. 6 is a diametrical, elevational, sectional view of the components of FIG. 5, as assembled, and prior to inflation of the bladder,
FIG. 7 is a view similar to FIG. 6, illustrating the relationship of the components after inflation of the bladder,
FIG. 8 is an elevational, sectional view of a patching seal in accord with the invention, as taken along section VIII—VIII of FIG. 10,
FIG. 9 is an enlarged, detail, elevational, sectional view of a retainer interconnection, and
FIG. 10 is an elevational, detail, sectional view as taken from the right of FIG. 8.

Figure 2:
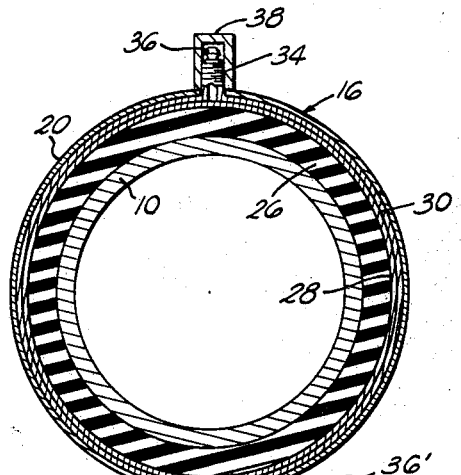

One embodiment of a coupling or seal utilizing the concepts of the invention is illustrated in FIGS. 1 and 2. In FIG. 1 a cylindrical conduit 10 is shown as positioned in a coaxial relationship to a similar conduit 12. The ends of the conduits are in spaced, opposed relationship and it will be noted that no threads or flanges are defined upon the conduits. In order to establish a sealed interconnection between the conduits, a substantially cylindrical sleeve 14 is imposed over the conduit ends and is of sufficient axial length to bridge the gap between the conduit ends.

The sleeve 14 is, of course, of a greater diameter than the conduits, and a retainer section 16 is provided adjacent each of its ends which consists of an angularly disposed, conical wall 18, a cylindrical wall 20, and an angularly disposed, outer, conical wall 22. The walls 18, 20 and 22 define a recess 24 of a generally truncated cross-sectional configuration which opens toward the associated conduit.

An annular deformable gasket 26 circumscribes the associated conduit and is located within each recess 24. The gasket 26 preferably is formed of rubber, or similar material. In FIG. 1, the left gasket 26, associated with the conduit 10, is shown in the normal unstressed state and as will be appreciated, the cross-sectional shape of the gasket substantially corresponds to that of the retainer recess 24.

Interposed between the "outer" cylindrical surface 28 of the gaskets and the inner side of the retainer wall 20 is an inflatable bladder 30 which has a flattened cross-sectional configuration, as will be apparent from FIG. 1 at the left. The bladder, preferably, is formed of metal, having relatively ductile characteristics, such as copper or aluminum, and may be constructed of flattened seamless tubing. However, if desired, it is possible to form the bladder of steel. The bladder is in the form of a split ring, the ends of the ring being illustrated at 32, FIGS. 2 and 5. Of course, the bladder ends are sealed, such as by welding. The circumferential length of the bladder is such that the ends 32 will substantially engage each other as to totally circumscribe the associated gasket. The axial width of the bladder 30 is substantially equal to that of the retainer wall 20, and a tubular stem or neck 34 communicates with the bladder interior and extends therefrom for purposes of inflation. The stem 34 may be similar to a conventionaly threaded valve stem for tires and, in the preferred arrangement, the stem bore is internally threaded and receives a conventional grease fitting 36 utilizing a spring-biased check valve to prevent the flow of fluid or grease from the stem or fitting. An opening is provided in the retainer wall 20 through which the stem extends.

The sleeve 14 is assembled to the conduits upon the bladder and gasket being positioned in the retainer sections, such as at the left of FIG. 1. The normal inner diameter of the gasket 26 is such as to permit the gasket and sleeve to be slipped over and axially positioned upon the conduit 10. Upon the conduits 10 and 12 being coaxially aligned, the right gasket 26 will be positioned upon the conduit 12 to the position shown in FIG. 1. Upon the sleeve 14 being positioned as desired with respect to the conduits, the operator places a conventional grease gun on the grease fitting 36 and proceeds to inject grease into the bladder 30. A hand-operated grease gun is capable of producing up to ten thousand pounds per square inch of fluid pressure and as the pressurized fluid is introduced into the bladder, the bladder begins to inflate, as will be apparent from the right at FIG. 1. Inflation of the bladder 30 about the circumference of the associated gasket 26 tends to deform the gasket radially inward and in an axial direction against the retainer walls 18 and 22. Upon the proper pressure being produced in the bladder 30, sufficient pressure between the retainer sections, conduits and gasket will be produced to effectively seal the sleeve 14 with respect to the conduits and complete the interconnection. If desired, internally threaded caps 38 may be threaded upon the stems 34 to protect the grease fittings from dirt and foreign matter.

The presence of the pressurized grease within the bladders 30 will maintain the bladders in a deformed condition and maintain the sealed relationship. If it is desired to remove the coupling from the conduits, the grease fittings are removed to permit the pressurized fluid to escape from the bladder. It is also within the scope of the invention to form the gasket of such dimension and material that upon the desired operating pressure being injected into the bladder, sufficient deformation of the bladder has occurred to deform the material of the bladder beyond its elastic limit, whereby a permanent "set" occurs in the bladder. In such event, the loss of pressurized fluid within the bladder will not remove the sealing forces imposed upon the gasket and, thus, protection against inadvertent release of sealing pressure is provided.

FIGS. 3 and 4 illustrate a variation of a coupling in accord with the invention. In these figures, components identical to those previously described are indicated by primes.

In FIG. 3 a conduit is indicated at 40 and one end of a sleeve 42 is shown as telescoping over the end of the conduit. The sleeve is provided with an outwardly extending flange 44. By utilizing the flange, a two-piece retainer 46 may be used to confine the gasket and bladder. The retainer components each constitute 180° of the assembled retainer configuration, the upper segment being indicated at 48 and the lower segment being indicated at 50. In order to interconnect the retainer segments, the segment 48 is provided with a pair of diametrically located levers 52, each pivotally mounted upon a pivot pin 54. The levers each include a hook portion 55 adapted to be received within a recess 56 defined in the lower segment 50. A rod 58 is located to selectively project within each of the recesses 56, and the rods 58 are movable in a circumferential direction in a slot, not shown, and are biased toward the associated recess by a spring 60. The hook portions 55 include lips 62 over which the rods 58 are positioned to maintain the hooks within the recesses 56, FIG. 4. The levers 52 also include shoulder surfaces 64 which cooperate with ears 66 formed on the retainer segments to maintain a firm interlocking of the segments.

The cross-sectional configuration of the retainer segments is apparent from FIG. 3, wherein the retainer segments include an outer radial wall 68 and an inner wall 70 adapted to overlap the flange 44. A cylindrical surface 72 is defined in the retainer segments and an opening 74 is defined in the upper segment through which the valve stem of the bladder extends. The gasket 26' is located in the retainer recess and the bladder 30' is disposed between the retainer surface 72 and the outer gasket surface 28'.

In operation, the embodiment of FIGS. 3 and 4 is quickly assembled, in that the gasket 26' and bladder 30' are slipped over the end of the conduit 40. The sleeve flange 44 is then brought into engagement with the gasket and the retainer segments 48 and 50 are aligned with the flange whereby the wall 70 will be located on the opposite side of the flange 44 with respect to the gasket 26'. The opening 74 is aligned with the bladder stem 34', and the retainer segment surfaces 72 are brought into engagement with the bladder. The locking rods 58 are biased downwardly out of the recesses 56 whereby the hooks 55 may be received within the recesses. The rods 58 are then released and are biased into the relationship shown in FIG. 4 which overlaps the lips 62. The bladder 30' is then inflated by a conventional inflating means, such as a grease gun, if it is desired to incorporate the grease fitting 36' within the bore of the bladder stem.

It will be appreciated that in the previously described embodiments, the walls 18 and 22 of the retainer section 16 and the flange 44 are inclined with respect to the axis of the associated conduit to tend to direct the gasket flow and deformation toward the conduit. While this retainer configuration is not necessary to the successful operation of the invention, it is helpful.

The embodiment of FIGS. 5 through 7 is particularly suitable for producing a more rigid interconnection between coaxially aligned conduits than may be produced by the previously described embodiments. In the embodiment of FIGS. 5 through 7, the retainer is formed of two substantially identical segments, the only difference in the segments being that the upper segment includes an opening defined thereon for receiving the stem of the bladder. The retainer segments 76 and 78 are each of substantially 180° of the circumference of the retainer and radially extending flanges 80 are defined at the circumferential edges of the retainers. One of the retainer edges includes a bolt 82 having heads 84 and 86 formed thereon, and the other retainer edge includes a slot 88 adapted to receive the bolt head 86. The width of the bolt head 88 is such that the bolt head may be inserted through the aligned slot and upon the bolt being rotated 90°, the bolt head 86 overlaps the flange in which the associated slot is defined to interconnect the retainer segments and produce an annular retainer configuration.

Internally, retainer segments are formed with several surfaces which, in the retainer assembly relationship, are of an annular configuration. The retainer recess 90 is defined by a cylindrical, central surface 92 and a conical surface 94 extends in either axial direction from the surface 92 to converge in a direction away from the surface 92.

The retainer segments 76 and 78 are assembled to bridge the opposed ends of coaxially aligned conduits 96 and 98. A deformable annular gasket 100 is located within the recess 90 in radial alignment with the surface 92. The gasket 100 is of a generally rectangular cross-sectional configuration and may include an inwardly radially extending annular projection 102 which may be used to produce the initial spacing between the conduit ends. The projection 102 is not required and may be omitted, if desired. A bladder 30', identical to the bladders of the previously described embodiments, is interposed between the retainer surface 92 and the outer surface 104 of the gasket. The bladder stem 34' extends through the retainer opening 106.

The mechanical metal-to-metal interconnection between the retainer and the conduits is produced by a pair of metal clamping rings 108. The clamping rings 108 are split at 110, FIG. 5, so as to be radially contractible.

The inner surface of the clamping rings is, preferably, provided with annular serrations or teeth 112, and the outer surface 114 of the clamping rings is of a conical configuration corresponding to the retainer surface 94 with which it is to be associated. The radial side surfaces 116 of the clamping rings 108 are disposed immediately adjacent the radial sides of the gasket 100, and the initial assembly of the embodiments of FIGS. 5 through 7 will find the components in the relationship of FIG. 6.

To render the clamp operative, the operator inflates the bladder 30' by the injecting pressurized fluid, such as by a grease gun, into the stem through the grease fitting 36'. The inflation of the gasket, as is shown in FIG. 7, will compress and deform the gasket material. A small portion of the gasket material will tend to deform inwardly into the spacing between the conduit ends to enlarge the projection and the inflation of the bladder will produce considerable expansion of the gasket in the axial direction against the clamping rings 108 to axially move the rings. Such axial translation of the clamping rings 108 will force the clamping rings into engagement with the surfaces 94 which tends to contract the rings inwardly into an intimate embedding relationship with the conduits, as will be apparent from FIG. 7. As the clamping rings will be in firm engagement with the retainer surfaces 94, a rigid metal-to-metal interconnection between the conduits and retainer is produced. While the aforementioned operation will cause a slight separation of the ends of the conduits, such separation is of a small degree and does not adversely affect the sealing efficiency of the coupling.

FIGS. 8 through 10 illustrate an application of the inventive concept as utilized in a patch for sealing a break or fracture in a conduit. In these figures, a conduit is represented at 118 having a fracture 120 formed in the wall thereof. The fracture 120 extends in the circumferential direction and, in the illustrated embodiment, is of the fine hairline crack type.

In order to seal the crack 120 against leakage, a strip of gasket material 122 is laid across the upper half of the circumference of the conduit. The gasket 122 is of a deformable material such as rubber. A metallic bladder 124 is superimposed over the gasket 122 and the bladder is of the flattened cross-sectional configuration similar to that of the aforedescribed embodiments. The ends 126 of the bladder are closed and a stem 128 extends from the upper portion of the bladder, and a grease fitting or similar valve mechanism may be located therein.

The retainer 130 of the embodiment of FIGS. 8 through 10 takes the form of a band or strap which is formed in two pieces. The upper portion 132 of the band is provided with an opening through which the valve stem 128 extends. The upper portion includes ends 134 which may be bent with two substantially right angles 136, as shown in FIG. 9. The lower portion 138 of the retainer strap is also formed with ends which are formed with two angles 140, as is apparent from FIG. 9. A pair of strap end holders 142 are each formed with a T-shaped recess 144 into which the strap ends may be located. Insertion of a keeper 146 having a rectangular configuration between the strap ends maintains the strap ends within the holder recess and, thus, permits the holders to firmly interconnect the ends of the retainer straps.

Upon the bladder 124 being inflated, the pressure produced upon the gasket 122 will firmly seal the gasket against the conduit in the region of the crack 120 and prevent furtherleakage through the crack. The tension forces produced within the retainer 130, due to the inflation of the bladder, are effectively resisted by the holders 142. It will be appreciated that the aforedescribed seal permits fractures and openings within large diameter conduits to be easily and quickly closed.

It will be appreciated that in the embodiments of FIGS. 1 through 4 the sleeves 14 and 42 form conduits and the retainer for the bladder and gasket could be formed on one of the conduits directly.

It is understood that various modifications to the disclosed embodiments may be apparent to those skilled in the art without departing from the spirit and scope of the invention.

I claim:

1. A coupling for interconnecting a pair of conduits comprising, in combination, an annular retainer carried by one of said conduits and circumscribing the other of said conduits, said retainer including a generally cylindrical section with depending side sections defining an annular pocket, an annular gasket of deformable material circumscribing the other of said conduits and disposed within said pocket, an inflatable bladder interposed between said gasket and the cylindrical section of said retainer, inflation means communicating with said bladder permitting inflation of said bladder to deform said gasket into sealing relationship with said other conduit and at least one of said side sections, said bladder being formed of metal and in the form of a radially split ring having ends disposed adjacent to each other.

2. A coupling as in claim 1 wherein said one of said conduits telescopingly receives said other conduit and at least one of said retainer side sections is an integral component of said one conduit.

3. A coupling for interconnecting a pair of conduits as in claim 1, wherein said bladder initially has a flattened transverse cross-sectional configuration.

4. A seal for conduits comprising, in combination, an annular retainer defining an annular pocket having annular sides, said retainer being adapted to circumscribe a conduit, a deformable solid annular gasket disposed within said pocket and adapted to circumscribe said conduit, an inflatable metal bladder of annular, flat configuration interposed between said gasket and said retainer within said pocket, inflation means connected to said bladder and extending through said retainer, said means facilitating the inflation of said bladder wherein said gasket is deformed into sealing engagement with said conduit and is supported by said sides, said bladder being formed of metal and in the form of a radially split ring having ends disposed adjacent to each other.

5. A seal for conduits as in claim 4, wherein said seal is for coupling substantially cylindrical conduits of substantially equal diameter having ends adapted to be connected in coaxial alignment, said retainer being adapted to circumscribe adjacent conduit ends upon the ends of adjacent conduits being brought into end-to-end relationship, said annular pocket circumscribing and accessible to said adjacent ends, said annular deformable gasket having sides spaced apart a sufficient axial dimension to permit said gasket to bridge said adjacent ends, a radially contractible clamping member located within said pocket on each side of said gasket and being aligned with each conduit circumscribed by said retainer, and clamping member contracting means defined on said retainer radially contracting said clamping members upon the associated conduit upon inflation of said bladder to radially compress said gasket upon said conduits and axially expand said gasket against said clamping members.

6. A coupling as in claim 5 wherein said radially contractible clamping members comprise radially contractible annular rings having an inner conduit engaging surface and an outer conical backing surface, said contracting means comprising a conical surface defined on said retainer on each side of said gasket and converging away from said gasket, said rings' conical backing surface angularly corresponding to and engaging a converging retainer surface whereby radial contraction of said rings is produced by axial translation of said rings due to axial expansion of said gasket upon inflation of said bladder.

(References on following page)

References Cited

UNITED STATES PATENTS

| | | | |
|---|---|---|---|
| 2,832,618 | 4/1958 | Knoll et al. | 277—34 |
| 3,007,518 | 11/1961 | Simpson | 277—34 X |
| 1,772,210 | 8/1930 | Dale | 277—34 X |
| 1,830,782 | 11/1931 | Burnish et al. | 285—348 X |
| 1,861,211 | 5/1932 | Gammeter | 285—379 X |
| 2,099,722 | 11/1937 | Byers | 277—34 X |
| 2,226,304 | 12/1940 | Dillon | 277—34 X |
| 2,306,160 | 12/1942 | Freyssinet | 285—97 X |
| 3,339,011 | 8/1967 | Ewers et al. | 277—34 X |

FOREIGN PATENTS

| | | |
|---|---|---|
| 696,020 | 10/1964 | Canada. |
| 1,127,240 | 8/1956 | France. |
| 1,461,769 | 11/1966 | France. |

THOMAS F. CALLAGHAN, Primary Examiner

U.S. Cl. X.R.

277—34; 285—339, 373